United States Patent
Wang et al.

(10) Patent No.: US 12,200,607 B2
(45) Date of Patent: Jan. 14, 2025

(54) APPARATUS AND METHOD FOR IMPROVED DATA SPEEDS FOR WIRELESS DEVICES

(71) Applicant: Huawei Technologies Co., Ltd., Shenzhen (CN)

(72) Inventors: Julia Wang, San Diego, CA (US); Limei Wang, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 835 days.

(21) Appl. No.: 17/271,717

(22) PCT Filed: Apr. 12, 2019

(86) PCT No.: PCT/CN2019/082455
§ 371 (c)(1),
(2) Date: Feb. 26, 2021

(87) PCT Pub. No.: WO2020/042623
PCT Pub. Date: Mar. 5, 2020

(65) Prior Publication Data
US 2021/0321322 A1    Oct. 14, 2021

Related U.S. Application Data (60) Provisional application No. 62/724,441, filed on Aug. 29, 2018.

(51) Int. Cl.
*H04W 48/16* (2009.01)
*H04W 48/04* (2009.01)
*H04W 48/20* (2009.01)

(52) U.S. Cl.
CPC ........... *H04W 48/16* (2013.01); *H04W 48/04* (2013.01); *H04W 48/20* (2013.01)

(58) Field of Classification Search
None
See application file for complete search history.

(56) References Cited

U.S. PATENT DOCUMENTS

2013/0005341 A1* 1/2013 Welnick ............... H04W 48/16
455/437
2013/0151139 A1* 6/2013 Park ..................... G01C 21/188
701/410
(Continued)

FOREIGN PATENT DOCUMENTS

CN    103813400 A    5/2014
CN    103988540 A    8/2014
(Continued)

OTHER PUBLICATIONS

3GPP TSG CT WG1, "LS on combined registration when the CS Mobility Management back off timer is running", 3GPP TSG-CT WG1 Meeting #92, draft C1-151948, May 24-29, 2015, 2 Pages, Sanya (P.R. China).

*Primary Examiner* — Jinsong Hu
*Assistant Examiner* — Alexander J Yi
(74) *Attorney, Agent, or Firm* — Slater Matsil, LLP (57) ABSTRACT

An apparatus and method for improved data speeds for wireless device are discloses. The wireless device locates at a first location within a first cell, and detects a failure to acquire SIB of the first cell. A waiting period is started in response to the failure to prohibit selecting the first cell during the waiting period. After determining that the wireless device has left a vicinity of the first location in the first cell, the wireless device connects to the telecommunication network via the first cell before an expiration of the waiting period. According to the disclosure, the wireless device does not need to wait for the expiration of the waiting period before recom1ecting to the first cell. The wireless device does not need to connect to a lower data rate cell during the (Continued)

waiting period when the first cell is available. The user experience is improved.

21 Claims, 6 Drawing Sheets

(56) References Cited

U.S. PATENT DOCUMENTS

| | | |
|---|---|---|
| 2014/0120915 A1 | 5/2014 | Wu |
| 2015/0109918 A1 | 4/2015 | Sharma et al. |
| 2015/0296444 A1 | 10/2015 | Sfar |
| 2016/0007252 A1 | 1/2016 | Larmo et al. |
| 2016/0249275 A1* | 8/2016 | Yang ................. H04W 48/04 |
| 2017/0064605 A1* | 3/2017 | Wang ................. H04W 76/27 |
| 2017/0339516 A1 | 11/2017 | Edge et al. |

FOREIGN PATENT DOCUMENTS

| | | | | |
|---|---|---|---|---|
| CN | 104303549 A | | 1/2015 | |
| CN | 105953805 A | * | 9/2016 | ............ G01C 21/32 |
| CN | 107615819 A | | 1/2018 | |
| WO | 2017105474 A1 | | 6/2017 | |

\* cited by examiner

APPARATUS AND METHOD FOR IMPROVED DATA SPEEDS FOR WIRELESS DEVICES

CROSS-REFERENCE TO RELATED APPLICATIONS

This patent application is a national phase filing under section 371 of PCT Application PCT/CN2019/082455, filed on Apr. 12, 2019 which claims priority to and the benefit of U.S. provisional patent application Ser. No. 62/172,441, filed on Aug. 29, 2018, and entitled "Apparatus and Method for Improved Data Speeds for Wireless Devices", which application is hereby incorporated by reference.

TECHNICAL FIELD

The present invention relates generally to cell reselection by a wireless device, and, in particular, to cell reselection for improved data speeds.

BACKGROUND

System information block (SIB) includes essential parameters for communicating with Evolved Node B (eNodeB). A user equipment (UE) receives SIB broadcasted from an eNodeB. Only after obtaining the SIB of the eNodeB, the UE is able to acquire the access sequences it has to transmit or the transmit power at which the eNodeB is transmitting to communicate with the eNodeB. Therefore, if the UE is not able to obtain SIB successfully, it cannot access a cell of the eNodeB. When the UE is located in a weak coverage area of a Long-Term Evolution (LTE) cell of the eNodeB, the UE may not be able to obtain SIB successfully. According to the 3rd Generation Partnership Project (3GPP) specification, in this scenario, the UE will start a barring timer and will not select the LTE cell before the timer expires, for example, with a period of 5 minutes. The UE may use other RATs (Radio Access Technologies) (for example, 3G/2G) with lower data rate. However, the user experience with 3G/2G is poor as compared to 4G LTE since the data throughput for 3G/2G is lower than for 4G LTE.

SUMMARY

In accordance with an embodiment of the present invention, a method performed by a wireless device for connecting to a telecommunication network is provided. The wireless device locates at a first location within a first cell of the telecommunication network, and detects a failure to acquire SIB of the first cell. A waiting period is started in response to the failure to prohibit selecting the first cell for connecting to the telecommunication network during the waiting period. After determining that the wireless device has left a vicinity of the first location in the first cell, the wireless device connects to the telecommunication network via the first cell before an expiration of the waiting period.

The present disclosure allows the wireless device to be back on the first cell as soon as it detects that the wireless device has left a vicinity of the first location in the first cell. The wireless device does not need to wait for the waiting period before reconnecting to the first cell. The wireless device does not need to connect to a lower data rate cell during the waiting period when the first cell is available. Therefore, the wireless device can obtain much higher data rate service and the user experience is improved.

Optionally, in any of the preceding embodiments, the wireless device monitors a change of location during the waiting period. When the wireless device moves from the first location to a second location, the wireless device compares a distance between the first location and the second location with a threshold, wherein the threshold indicates a boundary of the vicinity of the first location.

The distance comprises a vertical distance and a horizontal distance, wherein the threshold includes a horizontal threshold and a vertical threshold. The horizontal threshold differs from the vertical threshold.

Optionally, in any of the preceding embodiments, information of location comprises a latitude, a longitude, and an altitude. The vertical distance is a measure of the distance along an altitude dimension of the first location and the second location. The horizontal distance is a measure of the distance along a latitude dimension or a longitude dimension of the first location and the second location.

Optionally, in any of the preceding embodiments, the horizontal threshold is greater than the vertical threshold.

The wireless device calculates the distance between the first location and the second location based on the latitude, the longitude and the altitude of the first location and the second location, and compares the distance with the threshold, and determines that the second location where the wireless device locates currently is not in vicinity of the first location in the first cell.

Optionally, in any of the preceding embodiments, the wireless device starts a barring timer for the waiting period. Once determining that the wireless device has left vicinity of the first location, the wireless device clears the barring timer before connecting to the telecommunication network via the first cell.

Optionally, in any of the preceding embodiments, when the wireless device detects the failure to acquire SIB of the first cell, the wireless device connects to a second cell at the first location, and a data transfer speed of the second cell is less than a data transfer speed of the first cell. Since the data transfer speed is reduced when the wireless device connects to the second cell, the user experience is worse. Furthermore, if the wireless device cannot reconnect to the first cell during the waiting period, the user has to put up with the lower data transfer speed until the waiting period expires.

Optionally, in any of the preceding embodiments, the wireless device starts an additional timer in response to the determining that the wireless device has left the vicinity of the first location, and connects to the telecommunication network via the first cell after the additional timer expired, wherein the additional timer measures a period of time shorter than the waiting period. The additional timer is used to avoid ping-ponging and keep the wireless device from "ping-ponging" back and forth.

Optionally, in any of the preceding embodiments, the first cell may be 4G cell, and the second cell may be 2G/3G cell. When the wireless device fails to connect the first cell at the first location, the wireless device will connect the second cell if the second cell is available. After the wireless device left the vicinity of the first location, the wireless device will reconnect to the first cell when the first cell is available at the second location according to the disclosure. If the wireless device moves back and forth between the first location and the second location, the wireless device will be back and forth between the first cell and the second cell. The additional timer can keep the wireless device from "ping-ponging" back and forth between the 4G and 2G/3G.

In accordance with another embodiment, a mobile wireless device includes one or more processors and a memory storing programming for execution by the one or more processors, the one or more processors configured to: detect, at a first location within a first cell of the telecommunication network, a failure to acquire system information block (SIB) of the first cell, wherein a waiting period is started in response to the failure to prohibit selecting the first cell for connecting to the telecommunication network during the waiting period; determine that the wireless device has left a vicinity of the first location in the first cell; and connect to the telecommunication network via the first cell before an expiration of the waiting period.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

As used herein, a wireless device can be a user equipment (UE), an access terminal (AT), a mobile station (MS), a mobile wireless device, a mobile wireless communication device, a smartphone, a wirelessly enabled tablet computer, or any other type of wireless communication device. The terms wireless communication device, mobile wireless device, mobile wireless communication device, UE, AT, and MS are used interchangeably throughout this disclosure. In 3GPP LTE and in wideband code division multiple access/universal mobile telecommunications system (WCDMA/UMTS), the wireless communication device is typically referred to as a UE. In 1× Evolution-Data Optimized (EV-DO), the wireless communication device is typically referred to as an AT and in CDMA1× and Global System for Mobile communication (GSM), the wireless communication device is typically referred to as a MS.

One issue with this barring timer in the prior art is that the UE may leave the failure location where the UE fails to acquire SIB of the LTE cell prior to the baring timer expires. The failure location may be in a weak coverage area of the LTE cell. If the UE enters a good coverage area of the LTE cell rather quickly during a waiting period defined by the barring timer, the UE will still be prevented from connecting to the LTE cell. Thus, the user experience of the UE can be negatively affected because of a longer period of wait time than is necessary.

Since the waiting period can be as long as 5 minutes, a user may become frustrated if the user is paying for 4G and becomes aware that he/she is being forbidden to use 4G for several minutes. The sooner a UE is allowed on 4G LTE, the better the user experience of the UE can be. For example, inside of an elevator may be in a weak coverage area of the LTE cell. When a user enters the elevator and the UE of the user may fail to acquire SIB of the LTE cell, then the UE will be barred from the LTE cell for 5 minutes until the barring timer expires. It is possibly that the user may come out of the elevator in one minute and enter a good coverage area of the LTE cell again. However, the user still needs to wait for another 4 minutes until the barring timer expires. The user experience can be improved in this situation.

Disclosed herein are apparatus and method to resolve this issue in the current 3GPP solution to provide a better user experience. In an embodiment, the barring timer is cleared immediately upon the UE detecting that it has left a vicinity of the failure location in the LTE cell or after the UE has left a vicinity of the failure location for a short period (an additional timer may be initialized for monitoring the period).

Many different criterions may be utilized by the UE to determine whether it has left the vicinity of the failure location. For example, the UE records information of the failure location where the UE fails to acquire the SIB of the LTE cell, then the UE monitors a change of location (or movement to a new location) of the UE during the waiting period. The UE calculates distance between the new location and the failure location. In one embodiment, when the calculated distance satisfied one or more conditions or criteria, the UE determines that it has left the vicinity of the failure location.

For example, the conditions may include a threshold value and whether the calculated distance is greater than (or exceeding) the threshold value. The distance may include Euclidian distance or other applicable distance measure. For example, the distance may be measured based on changes in altitude in the UE device (without being affected by location changes along longitude or latitude dimensions). Other distance measurements based on location changes along different combinations of latitude, longitude and/or altitude may be applicable according to sensitivity in changes of cell coverage.

Once the UE determines that it has left a vicinity of the failure location, the UE can make another attempt to connect (e.g. sending connection requests) the LTE cell regardless (or independent of) whether the barring timer expires or not. The UE does not attempt to perform cell reselection (which can take up considerable amount of resources) within a vicinity of a previous location.

In an embodiment, the UE obtains or monitors the change of location of the UE based on a positioning hardware of the UE. The positioning hardware may include a positioning chipset or a sensor that receives signals from Global Positioning System (GPS) or other applicable wireless sources (e.g. access points) for identifying the UE's location. In another embodiment, the UE includes altitude monitor, which can monitor the altitude changes of the UE. Once the UE find it has left the vicinity of the failure location, it will include the LTE cell in selection list for connecting to the telecommunication network. In another embodiment, the UE does not monitor the location of itself all the time. When the UE fails to acquire the SIB of the LTE cell, it starts to obtain the location of itself periodically (for example, 10 seconds or other applicable intervals).

These criterions enumerated above are merely examples and the criterions are not limited to those described above. Those of ordinary skill in the art will recognize that other criteria may be utilized for determining whether the UE has left the vicinity of the first location in the first cell.

Disclosed herein are method and apparatus to improve user experience after the UE of the user fails to acquire the SIB of the LTE cell. In an embodiment, when UE receives a notification that system information of a cell has changed, the UE will performs SIB acquisition of the LET cell. When the UE locates on a weak coverage area of the LTE cell, it may not be able to obtain SIB of the LTE cell successfully. For example, the UE cannot receive SIB from the LTE cell or the UE just receives a portion of the SIB and some parts of the SIB are lost. In response to the acquirement failure of the SIB of the LTE cell, the UE will start a barring timer which prevents the UE from connecting the LTE cell for a waiting period.

Then the UE will perform intra-RAT cell selection for other suitable LTE cell. If no other suitable LTE cell is available, the UE will perform inter-RAT cell selection and will camp on the 2G or 3G cell when there is a suitable 2G or 3G cell. The UE can clear the barring timer when it detects that the UE has traveled a predetermined distance from the failure location before the barring timer expires, and attempts to reselect the LTE cell again. For example, the UE can include the LTE cell for cell selection list for the reselection. In one embodiment, a predetermined distance can specify or indicate a boundary of a vicinity of a failure location (or a previous location as recorded/stored where the UE failed to connect to the LTE cell).

The UE can perform standard procedure based on the cell selection list to connect to the LTE cell if the current location is in good coverage area of the LTE cell and the UE is enable to acquire SIB of the LTE cell at the current location. The UE performs cell selection (in an embodiment, the cell selection is triggered by the change of location) according to, for example, standard cell selection procedures/criteria defined in the 3GPP/3GPP2 specification. The UE selects to the most preferred, available system (for example, LTE) according to the cell reselection criteria.

The disclosed mechanism provides an advantage of allowing the UE to be back on the 4G LTE network as soon as it detects that it has left a vicinity of the first location in the first cell without waiting for the expiration of the barring timer. Therefore, the UE can obtain much higher data rate service and the user experience is improved. In some embodiments, the UE can obtain high speed LTE service up to 5 minutes earlier than would occur if the UE had to wait until the expiration of the barring timer. This improvement in data rate service results in a better user experience. Furthermore, it reduces the likelihood that the user becomes frustrated or angry for paying for 4G service, by becoming aware that he/she is being forbidden from accessing 4G service for several minutes or longer.

Furthermore, a vicinity can be configured to control or reduce the number of attempts to perform cell reselection. A vicinity may be bounded with varied absolute distance from a failed location along different directions based on likelihood of changes in cell coverage strengths. A UE may need to use position tracking resources (e.g. based on GPS, Wi-Fi, or other applicable physical/location sensing/measurement mechanisms etc.) to monitor or track whether it is still within a vicinity without a need to perform cell-reselection while remaining within the vicinity. In UE, position tracking may require much less resources than cell reselection attempts. Thus, resource usages can be managed without unnecessary reselection attempts.

It should be noted that the disclosed apparatus and method can be applied to any RAT and network hierarchical levels (not merely between 3G and 4G, but between any two systems having a disparity in the quality of the user experience between the two systems, for example, 4G and 5G), thereby leading to an improvement in user experience.

Figure 1:
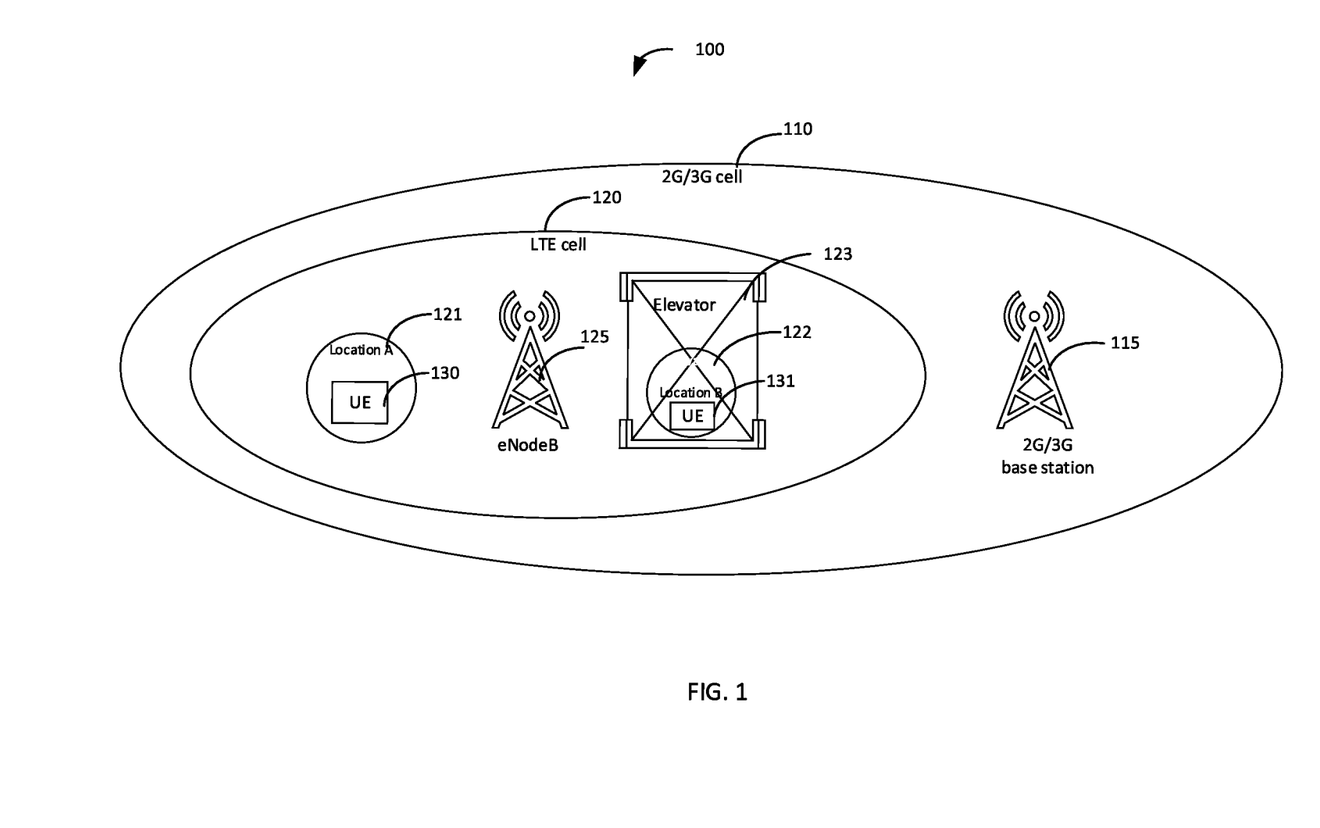
FIG. 1 illustrates a network for communicating data.

FIG. 1 illustrates a network 100 for communicating data. The network 100 comprises a plurality of base stations (BSs) including base station 115 of 2G/3G and eNodeB 125 of 4G, a plurality of user equipment (UEs) 130, 131. The base station of 2G/3G 115 has (or covers) a coverage area 110, the eNodeB 125 has a coverage area 120. In some embodiment, the coverage area 110 and the coverage area 120 may overlap with each other. Optionally, the coverage area 110 may encompass or include the coverage area 120. As used herein, the term BS may also be referred to as a cell, an E-UTRAN Node B (eNodeB), a base transceiver station (BTS), an access point (AP), or a transmission point, and these terms may be used interchangeably throughout this disclosure. The BSs 115, 125, may comprise any component capable of providing wireless access by, inter alia, establishing uplink and/or downlink connections with the UEs 130, 131. The UEs 130, 131 may comprise any component capable of establishing a wireless connection with the BSs 115, 125. Examples of an UE can include smart phones, laptop computers, and tablet computers or other applicable user device. In some embodiments, the network 100 may comprise various other wireless devices, such as relays, femtocells, etc.

A UE may need to update SIB of the LTE cell in some situations or circumstances. For example, when a UE is located in a weak coverage area (e.g. location B 122) of the LTE cell. Alternatively, the UE can update SIB periodically. In one embodiment, a UE located in location B 122 can send a request to acquire SIB of the LTE cell from the eNodeB 125. Since signals received from eNodeB 125 are weak in the location B 122, the UE may fail to receive the SIB of the LTE cell from the eNodeB 125 before time out or within a time out period after sending out the SIB request. The UE should start a barring timer in response to the failure of the SIB acquirement and be prevented from connecting to the same LTE cell before the barring timer expires. However, if the UE moves to other good coverage area of the LTE cell 120, such as out of elevator 123, the UE may clear the barring timer, and select back to the LTE cell which has higher data rate than 2G/3G cell (e.g., reselect back to 4G LTE from 2G/3G) before the expiration of the timer. This is possible since the new location of the UE is in good coverage area of the LTE cell. Therefore, the UE does not need t to remain waiting in the less preferred system (e.g. 2G/3G cell 110).

The condition that allows the UE to clear the barring timer and reselect back to the preferred system (LET cell) before the expiration of the timer is referred to as a detection criteria. The UE may record or store a failure location where the UE fails to acquire SIB. The UE can determine whether the UE has traveled (or moved) to a new location which is not in (or outside of) a vicinity of the failure location based on the detection criteria. If the detection criteria is not met, the UE 130 may have to remain on the systems it falls back to (e.g. 2G/3G system) until the timer expires. The detection criteria may be based on a measurement that the UE already performs for other reasons (e.g. GPS positioning), thereby minimizing the impact of the reselect mechanism on resource usage, such as battery power consumption. However, it is not necessary that the detection criteria utilize a measurement already required of the UE. In some embodiments, the UE may be required to perform a measurement not otherwise needed by the UE in order to determine whether the detection criteria has been satisfied.

A vicinity of a location may be configured with a certain distance, L, from the location. The absolute value of L may or may not be the same along different directions or dimensions, such altitude, latitude, longitude or a combination thereof. The UE can determine that the UE is located outside of the vicinity of the location if the UE detects that the UE is currently located away from the location with a distance greater the L. The distance, L, may be dynamically or statically configurable. In some embodiments, the UE may be located at a new location significantly different from an old location if the new location is outside of the vicinity of the old location.

When a UE fails to acquire the SIBs of the LTE cell and starts the barring timer, the UE may record information of a first location (or the UE's current location), e.g. location B 122, where the SIBs acquirement failure occurs. In an embodiment, the information of the first location can include multiple values indicating latitude, longitude and altitude (or multiple dimension components) of the location. The UE can keep monitoring location of itself or monitoring location of itself periodically (e.g. 10 s or other proper intervals). The UE calculates the distance that it has traveled from the recorded location. If the calculated distance is greater than a threshold, such as a value configured for a boundary of a vicinity of the first location (or a recorded location), the UE can initiate cell reselection operation to get back to LTE cell. In some embodiments, the UE can include the LTE cell for cell reselection. For example, the UE 131 may fail to connect to LTE cell 120 at location B 122. The UE 131 moves away from location B 122 to location A 121, the UE 131 can calculate the distance between the location B 122 and the location A 121 to determine whether the distance is greater than the threshold when the UE 131 determines whether to make an attempt for cell reselection at location A 121.

The threshold distance may be predetermined or dynamically configured, for example, to indicate a boundary of a vicinity of a location. A vicinity of a location may be configured with a consideration that if a UE fails to acquire SIBs of an LTE cell, it is likely that the UE may have moved out of the area with weak cell coverage as the experienced failure to acquire SIBs in the location.

A UE can connect to the LTE cell again by including or inserting an identifier of the LTE cell into cell selection list, and start the procedure for connecting the telecommunication network via the LTE cell. If the UE fails to connect to the LTE cell at the current location, the UE will take the current location as a failure location, records the location information of the current location and monitors whether the UE moves away from a vicinity of the newly recorded location for reconnection attempt. In some embodiments, the UE may restart the baring timer substantially when detecting the failure to connect to the LTE cell at the current location regardless whether the barring timer has expired or not.

The distance between a failure location and a current location may be determined according to Euclidian distance measure or other applicable distance measures based on recorded location parameters. For example, a UE may detect failure in acquiring SIB at a first location. The UE can record the information of the first location including latitude, longitude and altitude of the first location. The UE keeps monitoring the current location of itself or obtain location of itself periodically. The current location of UE can be monitored along multiple dimensions, such as a longitude, a latitude and an altitude. The UE calculates the distance it has traveled from the first location based on the information of the first location and the current location. The UE determines that it has left the vicinity of the first location when its traveled distance is greater than a predetermined threshold. Then the UE can try to reconnect to the LTE cell again, e.g. by including or appending identifiers of the LTE cell in cell selection/reselection list. The UE is allowed to connect the LTE cell when the second location is in a good coverage area of the LTE cell.

In one embodiment, a traveled distance of the UE may comprise multiple values or components, such as a vertical distance and a horizontal distance. The vertical distance is a measure of the distance along an altitude dimension of the first location and the second location. The horizontal distance can be a measure of the distance between the first location and the second location along a surface of with both longitude and latitude dimension. A distance threshold for a vicinity of a previous location (as recorded) may include a single threshold value. Alternatively or optionally, a distance threshold may include multiple values including, for example a horizontal threshold and a vertical threshold. Whether the traveled distance exceeds the threshold may be determined based on a comparison between the traveled distance and the distance threshold. The comparison may be based on a combination of the horizontal threshold and the vertical threshold. In some embodiments, the value of the horizontal threshold may differ from the value of the vertical threshold. For example, the traveled distance may be determined to be outside of the vicinity if either the vertical distance is greater than the vertical threshold, or the horizontal distance is greater than the horizontal threshold, The horizontal threshold may be configured to be greater than the vertical threshold according to difference in sensitivity in changes of LTE cell signal coverage (or other targeted cell signal coverage) along different directions.

In a possible scenario, signal strength of a cell coverage may strengthen with a short vertical movement (location changes) without horizontal movements (or changes along longitude and latitude dimensions. For example, a UE may fail to acquire SIBs of LTE cell when entering an elevator on the 1st floor. When the UE (e.g. carried by a user) in the elevator moving from 1st floor to 5th floor, and out of the elevator on the 5th floor, the UE may enter a good coverage area of the LTE cell. The distance between the failure location and the current location should be the height difference between the 1st floor and the 5th floor. When the height difference between the 1st floor and the 5th floor is greater than the vertical threshold, the UE will include the LTE cell in selection list and connect to the LTE cell since the UE has left the vicinity of the 1st floor.

In one possible implementation, the UE does not attempt to reconnect to the LTE cell or a target cell (e.g. including the LTE cell in selection list) as soon as the UE left the vicinity of the failure location. The UE may wait for an additional period of time (e.g. by starting an additional timer) in response to the determination that the UE has left the vicinity of the failure location in the LTE cell. The UE may reconnect to the LTE cell after the additional timer expired. The additional period of time may be substantially shorter than the waiting period.

When the UE moves between the failure location and the new location (which is out of the vicinity of the failure location) back and forth, the UE may switch cell between LTE cell and 2G/3G cell continuously. The additional timer can keep the UE from "ping-ponging" back and forth between LTE cell and 2G/3G cell. The UE will reselect the LTE cell only when it is determined that the UE is still out of the vicinity of the failure location when the additional timer expired.

The examples of detection criteria provided above are merely examples and those of ordinary skill in the art will recognize that the detection criteria is not limited to these examples, but that other conditions and criteria may be utilized for the detection criteria.

Figure 2A:
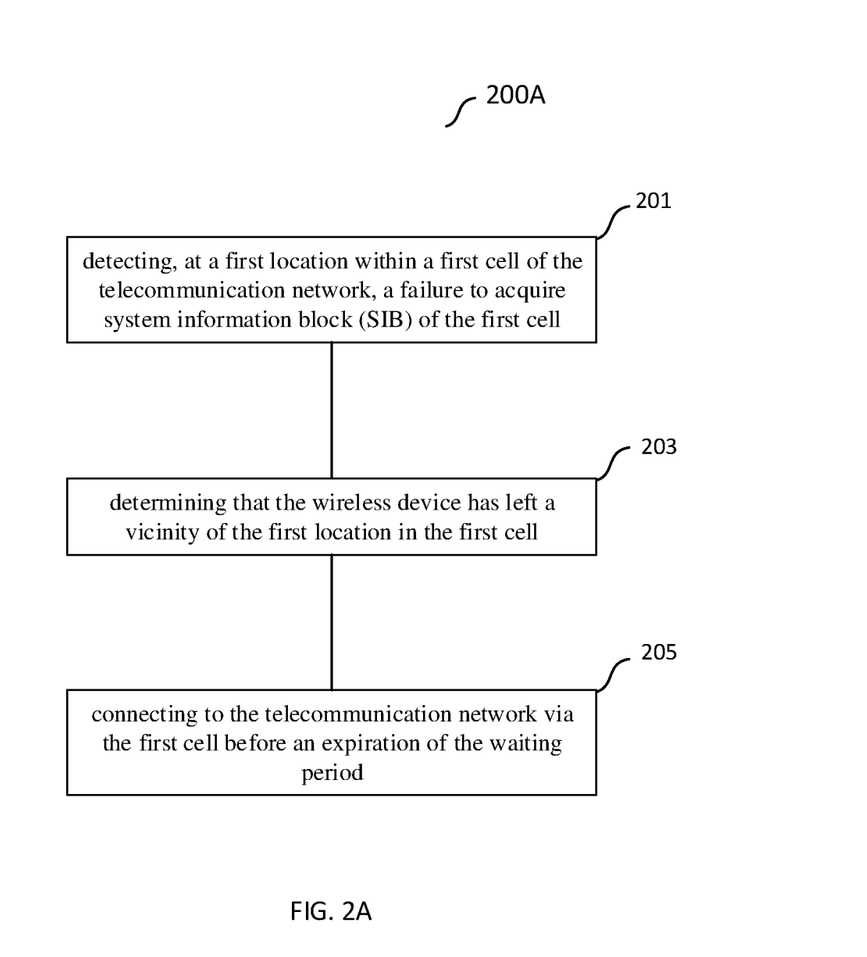
FIG. 2A is a flowchart illustrating an embodiment of a process in a UE to perform system reselection back to a preferred system.

FIG. 2A is a flowchart illustrating a method 200A to perform system reselection back to a preferred system. Process 200A may be performed by a wireless device, such as a UE. The method 200A begins at block 201 where the wireless device detects a failure to acquire system information block (SIB) of the first cell at a first location within a first cell of the telecommunication network, wherein a waiting period is started in response to the failure to prohibit selecting the first cell for connecting to the telecommunication network during the waiting period. At block 203, the wireless device determines that it has left a vicinity of the first location in the first cell. The method 200A goes to block 205. At block 205, the wireless device connects to the telecommunication network via the first cell before an expiration of the waiting period. The method 200A allows the wireless device to be back on the first cell as soon as it detects that the wireless device has left a vicinity of the first location in the first cell. The wireless device does not need to wait for the waiting period before reconnecting to the first cell. The user experience is improved.

Figure 2B:
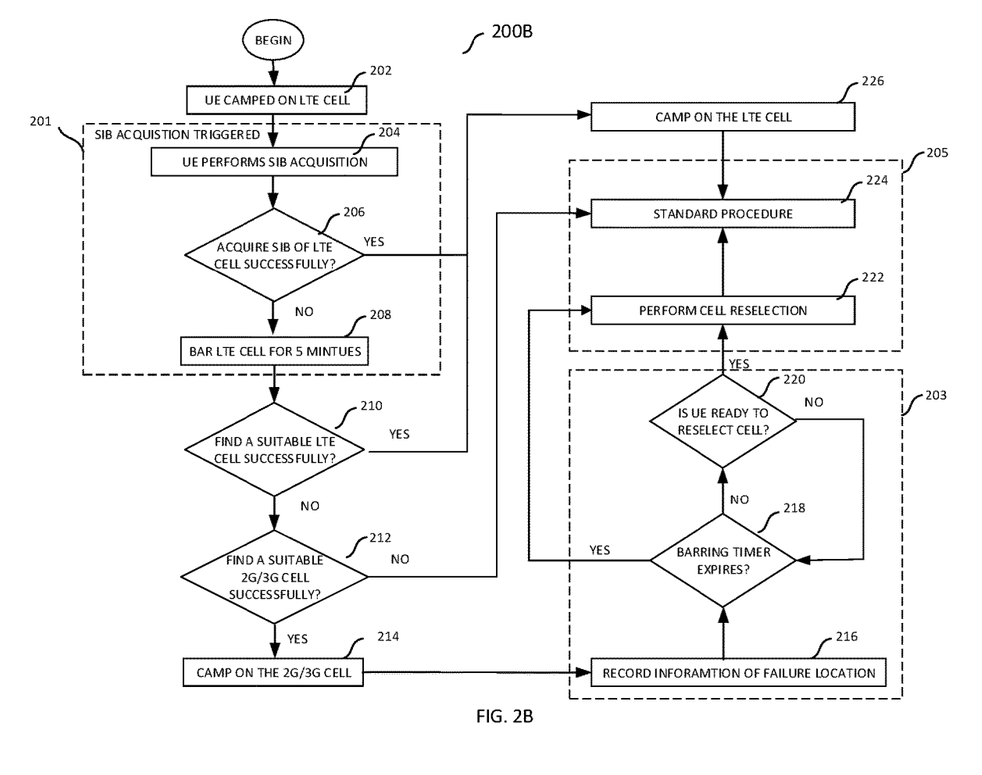
FIG. 2B is another flowchart illustrating an embodiment of a process in a UE to perform system reselection back to a preferred system.

FIG. 2B is another flow chart illustrating a method 200B in a UE for improving data speed when UE fails to acquire SIB of the LTE cell.

Exemplary methods (or processes) 200A and 200B may be performed by a processing logic that may comprise hardware (circuitry, dedicated logic, etc.), software (such as is run on a dedicated machine), or a combination of both. For example, method 200A and 200B may be performed by some components of system 100 of FIGS. 1 and/or 4. Method 200A may be performed according to some steps or operations included in method 200B.

The method 200B begins at block 202 where the UE camps on (or connects with) the LTE cell normally. The UE may initiate SIB acquisition procedure in some conditions. For example, SIB acquisition procedure may be triggered when the UE comes out of a coverage area of the LTE cell, or, when the UE receives a notification that system information of the LTE cell has changed. At block 204, the UE performs SIB acquisition from the eNodeB of the LTE cell. At block 206, the UE determines whether it acquires the SIB successfully. If, at the block 206, the UE successfully acquires SIB, then the method 200B proceeds to block 226 where the UE connects to the telecommunication network via the LTE cell, after which, the method 200B goes to standard procedure. If, at block 206, the UE fails to acquire SIB, then the method proceeds to block 208 where the UE will be barred from the LTE cell for a waiting period (e.g. 5 minutes), and the method 200B goes to block 210.

At the block 208, the LTE cell is barred from cell selection list (or from sending selection requests to the LTE cell) for 5 minutes. The UE may start a barring timer for monitoring the waiting period. The UE is prevented from selecting the LTE cell before the barring timer expires. At block 210, the UE performs intra-cell selection to determine whether there is another suitable LTE cell, if the UE finds another suitable LTE cell, then the method 200B proceeds to block 226. If there is no suitable LTE cell, the method 200B proceeds to block 212 where the UE performs inter-RAT cell selection to determine whether a suitable 2G/3G cell can be found successfully. If the UE finds a suitable 2G/3G cell, the method 200B proceeds to block 214 where the UE camps on the 2G/3G cell, then the method 200B proceeds to block 216. If the UE does not find a suitable 2G/3G cell, the UE starts a standard procedure defined by the 3GPP/3GPP2. In one embodiment, blocks 212 and 214 may be optional. When the UE fails to find another suitable LTE cell at block 210, the method 200B can goes to block 216 directly.

At block 216, the UE records the information of its current location as the failure location where the UE fails to acquire the SIB. Alternatively or optionally, the UE can record information of the failure location when it determines that there is no suitable LTE cell at block 210. At block 218, the UE determines whether the waiting period has passed. In one embodiment, the UE starts a barring timer for monitoring the waiting period. If the waiting period has passed, the method 200B proceeds to block 222 where the UE makes an attempt to reselect the LTE cell. The UE can connect to the telecommunication network via the LTE cell when the current location of the UE is in good coverage area of the LTE cell. If the waiting period has not passed, the method 200B proceeds to block 220.

At block 220, the UE can determine (e.g. periodically and/or dynamically in response to sensor data indicating location changes) whether the UE is ready to perform cell reselection. For example, if the UE has left the vicinity of the failure location, the method 200B may proceed to reselect the LTE cell (e.g. by including identifiers of the LTE cell into cell selection list) at block 222. If the UE cannot complete the cell reselection, the method 200B can record a new failure location at block 216. If the UE completes the cell reselection, the method 200B proceeds to block 224 where standard procedure is performed. When the LTE cell is included in the cell selection list, the UE performs standard procedure for connecting to telecommunication via the LTE cell when the current location is in good coverage area by the LTE cell and completes other requirements in the standard procedure. In one embodiment, the UE clears the barring timer after the UE determines to proceed with cell reselection operation (e.g. when detecting that it has left the vicinity of the failure location) in block 220. In one embodiment, blocks 212 and 214 may be optional. When the UE fails to find another suitable LTE cell at block 210, the method 200B can goes to block 216 directly.

There are a number of methods by which the UE may determine that the current location is not located in the vicinity of the failure location. For example, the UE can monitor the location of itself based commonly used technology (e.g. via GPS sensors or other applicable location sensors), and the UE may calculate or track the distance between the current location of the UE and the failure location periodically (e.g. every 10 seconds or other applicable time period). Once the traveled distance is greater than a predetermined threshold, the UE determines that it has left the vicinity of the failure location.

In one possible implementation, the UE can start cell reselecting procedure to connect to the LTE cell immediately without waiting for a barring timer to expire when the UE detects that a detection criteria of UE having left the vicinity of a failure location is met. In another possible implementation, the UE may start an additional timer when the UE detects that it has left the vicinity of the failure location. The additional timer measures a period of time shorter than the waiting period. The UE reselect the LTE cell after the additional timer is expired. The additional timer is used to prevent the UE from ping-ponging between the LTE cell and 2G/3G cell. Only after the additional timer expires, the UE will includes the identifiers of the LTE cell into cell selection list.

Figure 3:
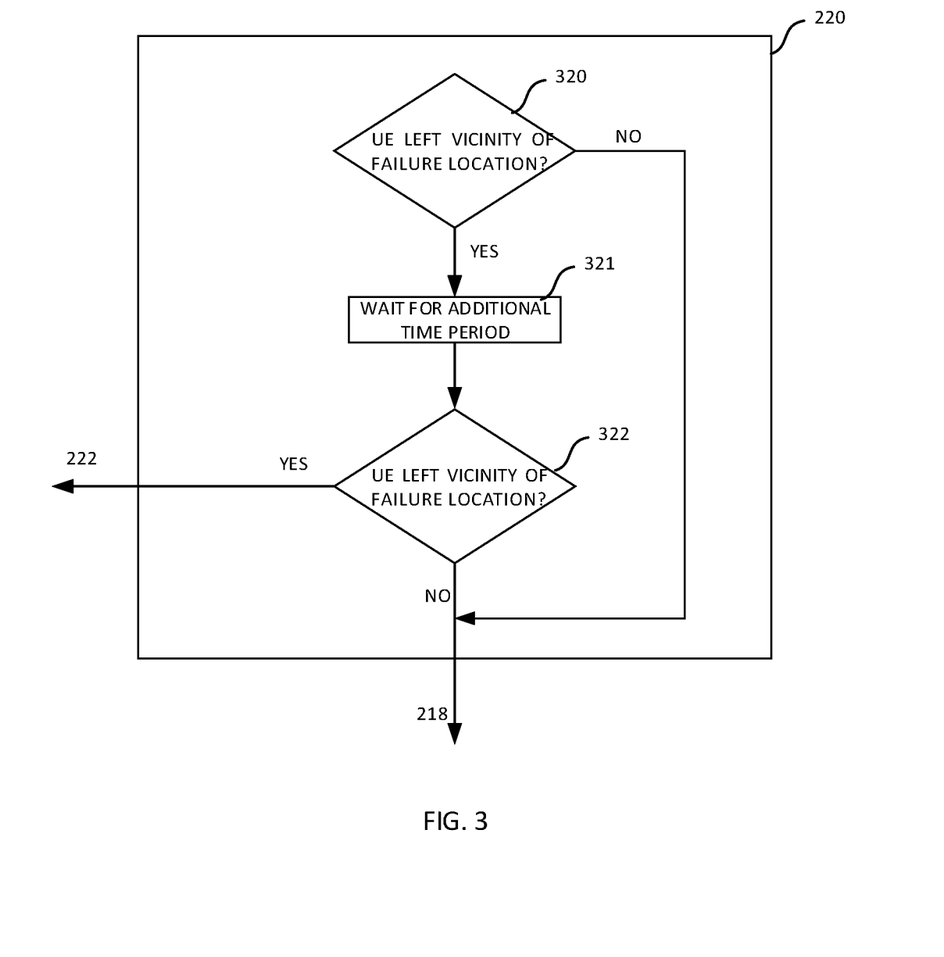
FIG. 3 is another flowchart illustrating an embodiment of a process in a UE to determine whether to perform system reselection back to a preferred system.

FIG. 3 illustrates an example process for a UE to determine whether to perform system reselection back to a preferred system, e.g. before an expiration of a barring timer, according to one embodiment of the present disclosure. Method 300 may be performed as a part of method 200B, such as block 220 of FIG. 2B. At block 320, if it is determined that the UE has left the vicinity of the failure location, the UE can start an additional timer to wait for a short period at block 321. When the additional time expires, the UE can determine, again, whether a current location of the UE is still located out of the vicinity of the failure location at block 322. If the UE determines that the UE moves back into the vicinity of the failure location when the additional timer expires, the UE may not be ready to perform the cell reselection. If, at block 322, the UE determines that the location of the UE is still located out of the vicinity of the failure location when the additional timer expires, then can proceed to perform cell reselection, for example, as in block 222 of FIG. 2B. Alternatively or optionally, operations performed at blocks 321, 322 may be optional for the UE to determine whether it is ready for making cell reselection attempts or requests.

Figure 4:
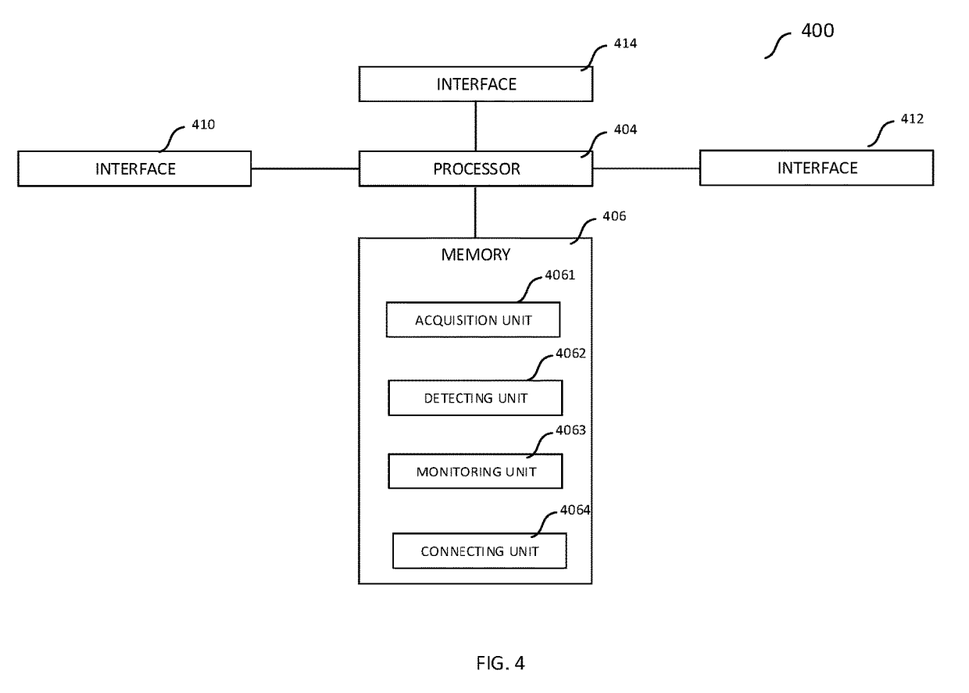
FIG. 4 illustrates a block diagram of an example UE system for performing methods described herein.

FIG. 4 is a block diagram illustrating an exemplary system for cell reselection. In one embodiment, system 400 may be based on a client device, e.g. including UE 130, 131 of FIG. 1. The memory 406 (e.g. a runtime memory) can include an acquisition unit 4061, a detecting unit 4062, a monitoring unit 4063, and a connecting unit 4064. The units 4061-4064 store instructions for performing functions described in the related part of FIG. 1-FIG. 3. The acquisition unit 4061 is configured to perform SIB acquisition procedure of block 204. The detecting unit 4062 is configured to monitor the SIB acquisition procedure and detect whether the SIB acquisition procedure is successful as described in block 206. The acquisition unit 4061 is further configured to perform the steps described in blocks 208-214. The monitoring unit 4063 is configured to record information of the failure location of block 216 and monitor the barring timer of block 218. The monitoring unit 4063 further configured to determine whether the UE has left a vicinity of the failure location. The connecting unit 4064 is configured to perform steps of block 222 and block 224.

More specifically, the UE can be a wireless device.

The detecting unit 4062 is configured to detect, at a first location within a first cell of the telecommunication network, a failure to acquire system information block (SIB) of the first cell, wherein a waiting period is started in response to the failure to prohibit selecting the first cell for connecting to the telecommunication network during the waiting period;

The monitoring unit 4063 is configured to determine that the wireless device has left a vicinity of the first location in the first cell;

The connecting unit 4064 is configured to connect to the telecommunication network via the first cell before an expiration of the waiting period.

The monitoring unit 4063 is specifically configured to monitor a change of location of the wireless device during the waiting period, wherein the location of the wireless device has changed from the first location to a second location; and compare a distance between the first location and the second location with a threshold, wherein the threshold indicates a boundary of the vicinity of the first location.

The connecting unit 4064 is specifically configured to connect to the telecommunication network via a second cell at the first location in response to the failure, wherein a data transfer speed of the second cell is less than a data transfer speed of the first cell.

The monitoring unit 4063 is further configured to start an additional timer in response to the determining that the wireless device has left a vicinity of the first location in the first cell, and instruct the connecting unit 4064 to connect to the telecommunication network via the first cell after the additional timer is expired, wherein the additional timer measures a period of time shorter than the waiting period; and the connecting unit 4064 is further configured to receive instruction from the monitoring unit 4063 and connect to the telecommunication network via the first cell.

Figure 5:
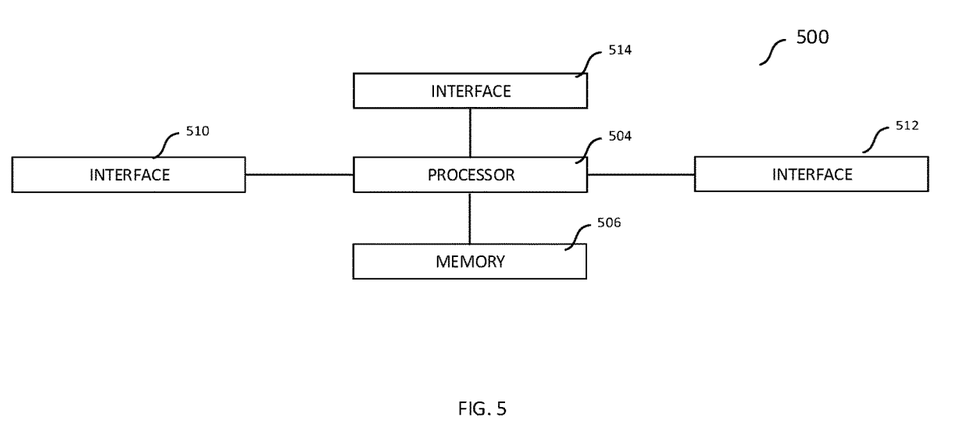
FIG. 5 illustrates one example of a data processing system, such as a UE, which can be used in conjunction with the embodiments described herein.

FIG. 5 shows one example of a data processing system such as mobile user device or a computer system, which may be used with one embodiment described in the disclosure. For example, the system 500 may be implemented as a part of the system shown in FIG. 1 or 4. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present disclosure.

For example, FIG. 5 illustrates a block diagram of a UE. As shown, the UE 500 includes a processor 504, a memory 506, and interfaces 510-514, which may (or may not) be arranged as shown in FIG. 4. The processor 504 may be any component or collection of components adapted to perform computations and/or other processing related tasks, and the memory 506 may be any component or collection of components adapted to store programming and/or instructions for execution by the processor 504. In an embodiment, the memory 506 includes a non-transitory computer readable medium. The interfaces 510, 512, 514 may be any component or collection of components that allow the UE 500 to communicate with other devices/components. For example, one or more of the interfaces 510, 512, 514 may be adapted to communicate data, control, or management messages from the processor 504 to network device (e.g. base station). As another example, one or more of the interfaces 510, 512, 514 may be adapted to allow a user to interact/communicate with the UE 500. The UE 500 may include additional components not depicted in FIG. 4, such as long-term storage (e.g., non-volatile memory, etc.).

In some embodiments, one or more of the interfaces 510, 512, 514 connects the UE 500 to a transceiver adapted to transmit and receive signaling over the telecommunications network While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method performed by a wireless device for connecting to a telecommunication network, comprising:

detecting, at a first location within a first cell of the telecommunication network, a failure to acquire system information block (SIB) of the first cell, wherein a waiting period is started in response to the failure, selecting the first cell for connecting to the telecommunication network being prohibited during the waiting period;

determining that the wireless device has left a vicinity of the first location within the first cell, wherein the determining that the wireless device has left the vicinity of the first location comprises:

detecting a change of location of the wireless device during the waiting period, wherein the location of the wireless device has changed from the first location to a second location within the first cell; and determining that the change of location considering both horizontal and vertical directions exceeds a threshold, wherein the threshold indicates a boundary of the vicinity of the first location within the first cell; and in response to the determining that the change of location exceeds the threshold, reconnecting, at the second location within the first cell, to the telecommunication network by sending a connection request message again via the first cell to the telecommunication network before an expiration of the waiting period.

2. The method of claim 1, wherein the determining that the change of location exceeds the threshold comprises:
comparing a distance between the first location and the second location with the threshold.

3. The method of claim 2, wherein the distance comprises a vertical distance and a horizontal distance, wherein the threshold includes a horizontal threshold and a vertical threshold, and wherein the horizontal threshold differs from the vertical threshold.

4. The method of claim 3, wherein the vertical distance is a measure of the distance along an altitude dimension of the first location and the second location.

5. The method of claim 3, wherein the horizontal distance is a measure of the distance along a latitude dimension or a longitude dimension of the first location and the second location.

6. The method of claim 3, wherein the horizontal threshold is greater than the vertical threshold.

7. The method of claim 1, wherein a barring timer is started for the waiting period.

8. The method of claim 7, further comprising:
clearing the barring timer before connecting to the telecommunication network via the first cell.

9. The method of claim 1, further comprising:
connecting to the telecommunication network via a second cell at the first location in response to the failure, wherein a second data transfer speed of the second cell is less than a first data transfer speed of the first cell.

10. The method of claim 1, further comprising:
starting an additional timer in response to the determining that the wireless device has left the vicinity of the first location within the first cell; and
connecting to the telecommunication network via the first cell after the additional timer is expired, wherein the additional timer measures a period of time shorter than the waiting period.

11. A wireless device, comprising:
one or more processors; and
a memory storing programming for execution by the one or more processors, the one or more processors configured to cause the wireless device to perform operations including:

detecting, at a first location within a first cell of a telecommunication network, a failure to acquire system information block (SIB) of the first cell, wherein a waiting period is started in response to the failure, selecting the first cell for connecting to the telecommunication network being prohibited during the waiting period;

determining that the wireless device has left a vicinity of the first location within the first cell, wherein the determining that the wireless device has left the vicinity of the first location comprises:

detecting a change of location of the wireless device during the waiting period, wherein the location of the wireless device has changed from the first location to a second location within the first cell; and determining that the change of location considering both horizontal and vertical directions exceeds a threshold, wherein the threshold indicates a boundary of the vicinity of the first location; and in response to the determining that the change of location exceeds the threshold, reconnecting, at the second location within the first cell, to the telecommunication network by sending a connection request message again via the first cell to the telecommunication network before an expiration of the waiting period.

12. The wireless device of claim 11, wherein the determining that the change of location exceeds the threshold comprises:
comparing a distance between the first location and the second location with the threshold.

13. The wireless device of claim 12, wherein the distance comprises a vertical distance and a horizontal distance, wherein the threshold includes a horizontal threshold and a vertical threshold, and wherein the horizontal threshold differs from the vertical threshold.

14. The wireless device of claim 13, wherein the vertical distance is a first measure of the distance along an altitude dimension of the first location and the second location.

15. The wireless device of claim 14, wherein the horizontal distance is a second measure of the distance along a latitude dimension or a longitude dimension of the first location and the second location.

16. The wireless device of claim 14, wherein the horizontal threshold is greater than the vertical threshold.

17. The wireless device of claim 11, wherein a barring timer is started for the waiting period, the one or more processors further configured to clear the barring timer before connecting to the telecommunication network via the first cell.

18. The wireless device of claim 11, the operations further comprising:
connecting to the telecommunication network via a second cell at the first location in response to the failure, wherein a second data transfer speed of the second cell is less than a first data transfer speed of the first cell.

19. The wireless device of claim 11, the operations further comprising:
starting an additional timer in response to the determining that the wireless device is at the second location significantly different from the first location; and
connecting to the telecommunication network via the first cell after the additional timer is expired, wherein the additional timer measures a period of time shorter than the waiting period.

20. A non-transitory computer-readable medium storing instructions, which when executed by one or more processors, cause a wireless device to perform operations comprising:

detecting, at a first location within a first cell of a telecommunication network, a failure to acquire system information block (SIB) of the first cell, wherein a waiting period is started in response to the failure, selecting the first cell for connecting to the telecommunication network being prohibited during the waiting period;

determining that the wireless device has left a vicinity of the first location in the first cell, wherein the determining that the wireless device has left the vicinity of the first location comprises:

detecting a change of location of the wireless device during the waiting period, wherein the location of the wireless device has changed from the first location to a second location within the first cell; and         determining that the change of location considering both horizontal and vertical directions exceeds a threshold, wherein the threshold indicates a boundary of the vicinity of the first location; and     in response to the determining that the change of location exceeds the threshold, reconnecting, at the second location within the first cell, to the telecommunication network by sending a connection request message again via the first cell to the telecommunication network before an expiration of the waiting period.

21. The method of claim 1, wherein the first location and the second location within the first cell are in an area covered by a base station.

\* \* \* \* \*